Jan. 10, 1928.  
H. A. ZIOLA  
1,655,720  
HEATING UNIT AND METHOD OF MAKING SAME  
Filed March 28, 1925  
2 Sheets-Sheet 1

Witness:  
Y.H.Wagner

Inventor  
H.A. Ziola  
By Robb, Robb & Hill  
Attorneys

Jan. 10, 1928.  H. A. ZIOLA  1,655,720
HEATING UNIT AND METHOD OF MAKING SAME
Filed March 28, 1925  2 Sheets-Sheet 2
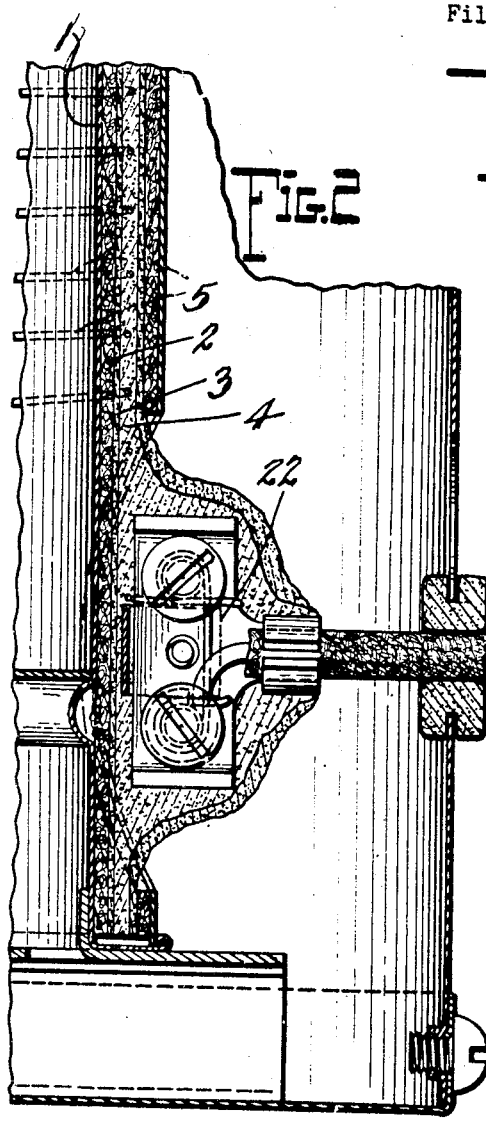
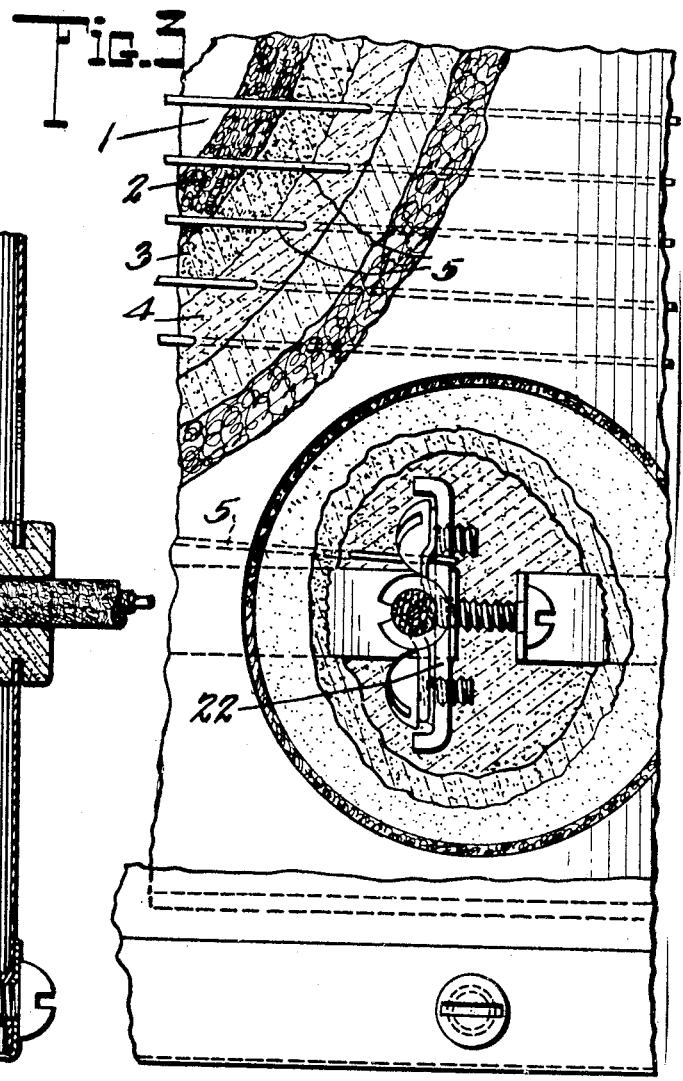
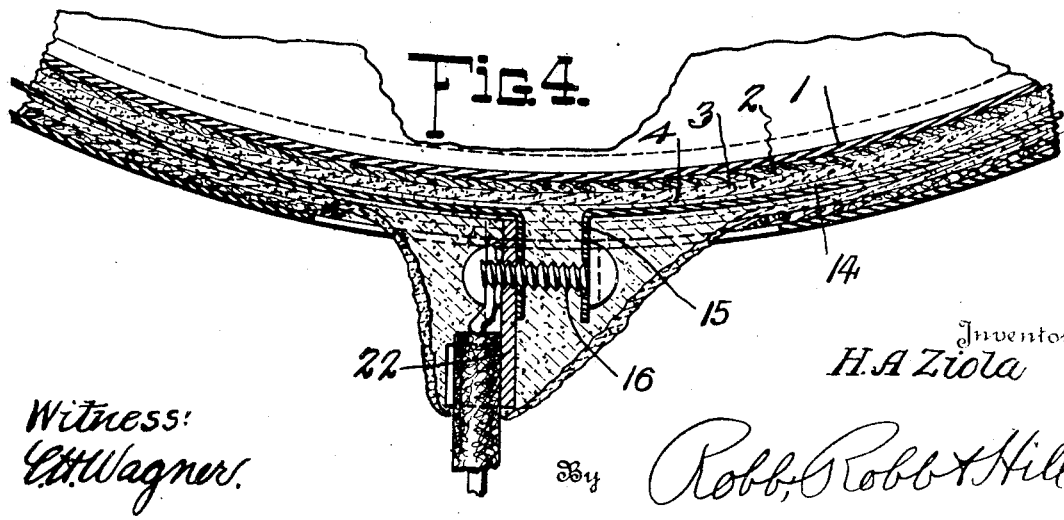
Inventor
H. A. Ziola
By Robb, Robb & Hill
Attorneys
Witness:
C. H. Wagner Patented Jan. 10, 1928.

1,655,720

UNITED STATES PATENT OFFICE.

HENRY A. ZIOLA, OF TOLEDO, OHIO, ASSIGNOR TO THE SWARTZBAUGH MANUFACTURING COMPANY, OF TOLEDO, OHIO, A CORPORATION.

HEATING UNIT AND METHOD OF MAKING SAME.

Application filed March 28, 1925. Serial No. 19,025.

Fireless cookers have heretofore been proposed, in which electrical heating units are employed to raise and maintain the temperature within the cooker chamber. The exacting requirements of heating elements for such use have rendered the ordinary heating plates unacceptable. In the first place, any liquid or solid boiling or spilling over from the contents of a receptacle in the chamber must not have access to the heating element itself since thereby the liquid may be evaporated and the residue scorched, thus imparting a burnt taste to the remaining contents of the receptacle. Furthermore, it has been found that many types of heating elements are short circuited and seriously damaged, beyond the ability of the ordinary user to repair, by this scorching of foodstuffs. Again, the atmosphere within a fireless cooker chamber is practically saturated with water vapor, which is known to have a seriously disruptive effect on the materials of which such heater elements may be composed.

It is therefore the purpose of the present invention to provide a heater element which is not subject to the difficulties enumerated, and the same consists in the method of preparing such a heater in a cheap, simple and exact manner, and in the article resulting thereby. In this element and the fireless cooker built therewith, it is impossible for the steam and vapor from the food, or the food itself, to come into contact with red hot wires or other parts. The construction renders it possible to entirely eliminate all baffle plates and insulation from the cooker chamber, and the resistance wires used in the heater are protected from the access of air or steam. Further, by the method employed in assembling the element, the parts are so treated that all volatile or decomposable constituents of the materials employed are driven off; and no subsequent contamination from such source need be feared. Also the element is prepared as an integral unit, capable of easily being placed and replaced.

My invention involves additionally a method of preparing a heating element which is assured of a long and continuous life, irrespective of whether used in cooker constructions or not, and one which is no longer subject to burning out when operated at normal voltage. My new method just mentioned disregards all of the usual rules for figuring resistance, as to quantity and length of the resistance wire for the heating element, the resistance being initially prepared to safely carry a supernormal amperage, a super-normal voltage being applied thereto to reduce its carrying capacity to a predetermined quantity.

On the accompanying drawings is represented by way of example a preferred form of execution of the said invention, in which:

Figure 2 is a cross section on an enlarged scale showing the relative positions of the layers forming the jacket.

Figure 3 is a fragmentary sectional view of a portion of the heating unit showing more clearly the layers of compositions forming the insulation, and one of the lead in connections.

Figure 4 is a horizontal sectional view of the same.

Figure 1:
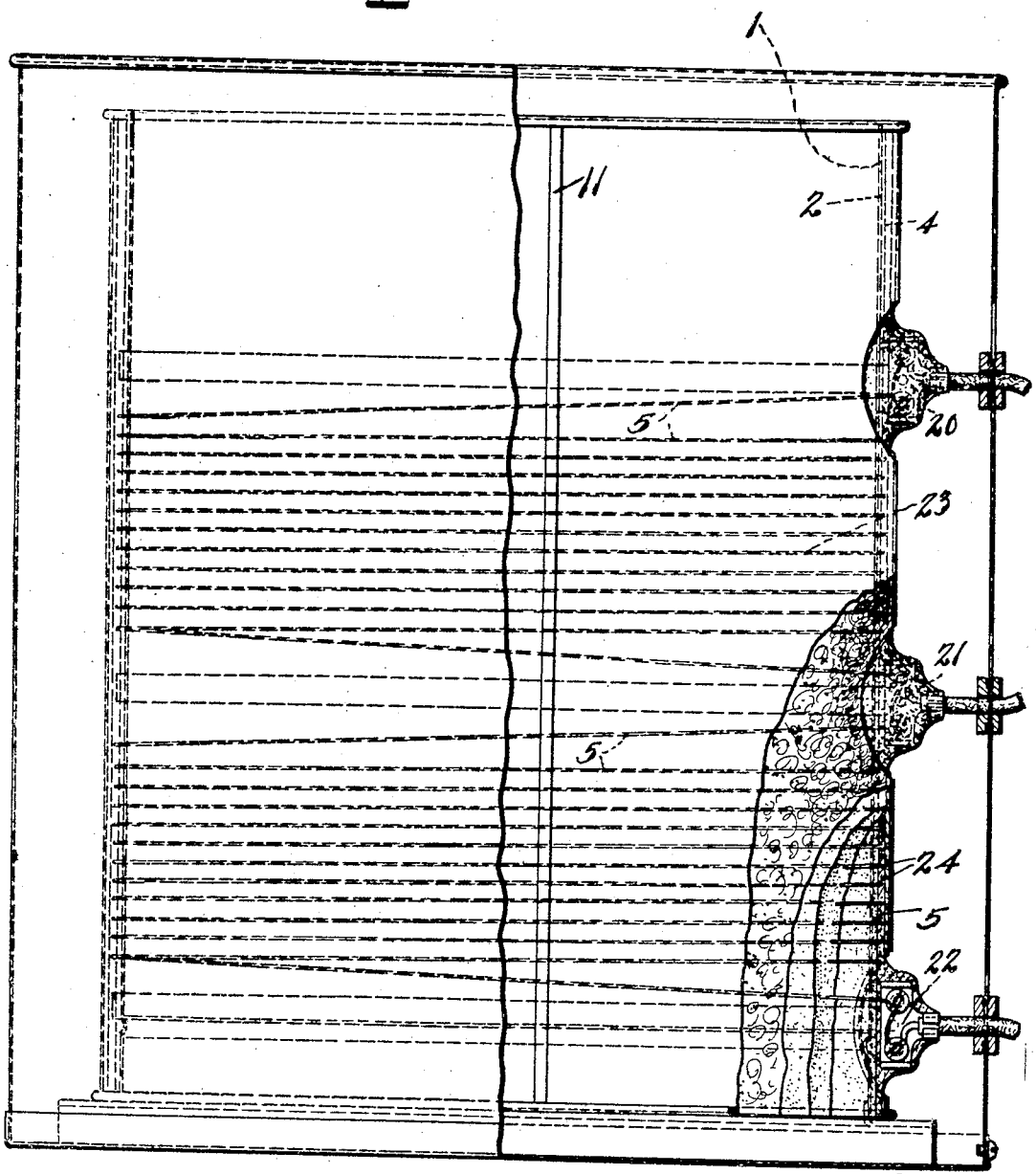
Figure 1 is a sectional view of a heater element according to this invention, in its completed form, but showing the jacket broken away to demonstrate the successive layers of its composition.

The first step in the manufacture of this heating unit is the preparation of a cylinder 1 of Monel or other non-oxidizable metal capable of resisting the influence of high temperature. This cylinder is prepared of an internal diameter to closely receive the vessel which forms the fireless cooker chamber proper. It is of such a length as to project at each end beyond the coil of wire to be placed thereon in the manner to be set forth hereafter.

A sheet of asbestos 2 is then placed over this cylinder. This asbestos must have no carbon content, and may be freed from such impurity by igniting or by any means now known in the art.

Over this sheet of asbestos 2 and uniting therewith is applied a layer of plastic composition 3. This composition is prepared by mixing (1) equal parts of water and silicate of soda with (2) silica-sandstone and zirconium oxide, to produce a paste-like consistency for easy manipulation. The purpose of this coating is to impregnate the sheet abestos and prevent the latter from disintegrating or becoming powdery when the element is in use. After it has been applied and smoothed down to a uniform layer, the thus far assembled unit is baked at 500° F. until thoroughly dry.

After cooling, a second coating of insulating composition 4 is applied. This composition is prepared by mixing silica-soapstone and zirconium oxide in equal proportions, and heating to approximately 3000° F. to ignite and volatilize and remove all foreign substance which may be driven off at such a temperature. The product is reduced to a suitable fineness, mixed with water to form an easily workable clayey mass and then applied in a thin uniform layer over the layer 3.

It is preferable to wind half the wire in one direction and half in the other to prevent induction losses where the apparatus is to be used with alternating currents.

The compound is permitted to harden until it will bear the pressure of the finger, and then the heating wires 5 are wound on to it. The compound is smoothed down and the element is again baked at 500° F. The heating wires 5 are now wound upon it.

When the wire is placed and the lead in wires attached therto lead in wires of pure nickel with asbestos insulation are connected to the heater at appropriate points, and led out at the sides of the unit.

A further layer of the insulating composition is applied to hold the wires in their allotted positions, and to surround them with a composition which no longer contains any substances which may react therewith at the working temperatures of the apparatus, or give off offensive or undesirable gases at such temperatures. The unit is again baked at 500° F.

A further coating of the impregnating compound is now applied, and while it is still moist a sheet of asbestos is placed over it and forced down into intimate contact therewith, so that the asbestos adheres closely to the unit, which is then again baked at 500° F.

The repeated baking, as each successive layer is applied, results in a uniform drying without cracking.

The outer metal sleeve 9 is then put in position and secured by seaming as shown at 11. The entire unit is thereupon connected by its lead wires to a source of current of double the voltage to be applied in actual use, i. e., 220 volts if the unit is intended for use on 110 volt mains, and internally heated to a temperature higher than that to which it will be subjected in normal use. The effect of this heating is to oxidize the element and cause it to permanently insulate itself from the surrounding compositions, so that if anything destructive to the material of the element be contained in these compositions, the film of oxide thus formed on the wire will prevent any damage thereto.

This heating to a temperature greater than that of normal use has also another effect of great importance. The composition immediately surrounding the wire is fused, and this fusion occurring at a higher temperature than that of normal use, the composition is thus brought into a final physical form, from which it cannot be changed during the subsequent employment.

In actual work, it has been found that when a 110 volt unit is being made, and 220 volts are applied thereto, the initial current flow is about 4000 watts. The resulting temperature may be as high as 1800° F.; and the ingredients of the impregnating compound unite with the insulating composition but do not penetrate to the wire. Even if by undue thinness of the insulating layer this siliceous impregnating compound or its ingredients come into contact with the wire, the latter will have already protected itself with a layer of oxide.

In this way a complete fusion of the composition and compound is obtained, but all foreign elements in the compound, left after drying in the baking oven, unite with the composition and render the whole an insulation capable of withstanding very high temperatures, and indeed much above those normally employed in the use of a fireless cooker or any other type of domestic electrical heating apparatus.

This heating wire is ordinarily composed of nickel chromium alloy; and lead wires of pure low resistance nickel ore used as terminals and taps.

With the use of two coils, as referred to heretofore, it is also possible to obtain three degrees of heating as shown in Figure 1, and which may be denominated "low", "medium" and "high", respectively corresponding to multiples such as, say, 165 watts, 330 watts, and 660 watts, respectively. This is done by connecting the current leads at the taps 20 and 22, 20 and 21, or 21 and 20—22 respectively, so as to connect the elements 23 and 24, respectively, in series, to use one element 23 alone, and to use both elements in parallel.

The 4000 watt initial current causes the formation of an oxide coating on the wire. The resistance of the wire changes, and therewith the current passing changes. This change is observed by a suitable watt meter and when the reading is 2640 watts, the operation is interrupted and the 220 volt current interrupted.

Now if the unit were connected to a 110 volt source when green, the reading would have been 720 watts, but after this preliminary baking by 220 volts, the reading is thereafter permanently 660 watts in the instance cited.

It will be understood that the seam 11 may or may not be used, as this is immaterial to the invention.

Having in view my especial object of achieving the provision of a heating unit which may be practically guaranteed against burning out for an indefinite period I note that the resistance coil is prepared to carry about 4000 watts at 220 volts. This wattage and voltage is specified by way of illustration but not of limitation. It is not essential to have any particular quantities since these will necessarily vary with the normal voltages and wattages to be employed. My main and essential intent is to apply to the resistance wire a supernormal voltage, and hence amperage. In the illustration employed herein there is imposed upon the element substantially four times the normal wattage. Under these conditions the factor of safety against burning out in service is 4; and by the use of my process the elements are constant in wattage consumption at normal load over and periods of time, in fact may be used indefinitely. Said elements are furthermore always protected against physical deterioration from the heat or insulation.

In designing my heating element, as previously suggested, all of the customary rules for figuring the winding of the resistance wire for the elements are disregarded. So far as I am aware, there has never been heretofore designed a heating element or device of this sort made for 110 volt current which would not burn up very quickly if connected to a 220 volt circuit. The foregoing I have accomplished in the carrying out of the method and product of my invention. A heating element of my invention designed for a 110 volt circuit drawing 660 watts will not burn out when connected to a 220 volt circuit and consuming then 2640 watts. This is due to the fact that although the element is made primarily to operate on 110 volts its ratio is brought down from a 220 volt 2640 watt heating element. Set forth in a different way, the heating element is designed so that it first carries 2640 watts at 220 volts, with safety, along the lines previously described. Therefore when said element is connected to a 110 volt circuit it will draw 660 watts and will never burn out, irrespective of whether it is embedded in a ceramic composition or not.

It is notable that in the structure as presented in the drawings there are utilized bands or hoops 14 having outwardly projecting extremities 15 connected together by screw fastenings 16, said fastenings embodying a head and a screw shank the latter adapted to screw into a terminal plate connector 17 which is positioned at one side of and in contact with the outward extension 15 at one end of the band 14. The lead wires extending from the unit are attached to the terminal plates 22. The resistance wire terminals are properly secured to screws applied to extensions projecting upwardly and downwardly from the said terminal plates 22, as seen best in Figures 2 and 3.

Having thus described my invention, what I claim as new and desire to secure by Letters Patent of the United States, is:

1. In a heater element for fireless cookers, a metal foundation, a coalesced covering therefor, comprising, an asbestos sheet on said foundation, a baked layer impregnating said sheet, a thermal element, an insulating body formed upon said element, a second impregnating layer and a second sheet of asbestos, and a metal jacket to protect such coalesced structure.

2. The method of making an electrical heating element, comprising providing a suitable foundation, placing a sheet of asbestos thereover, impregnating said asbestos with a suitable filling and reinforcing composition, coating said impregnating composition with a refractory insulating composition, placing an electrical resistance element thereon, surrounding said resistance element with an insulating composition, impregnating this composition with a suitable filling and backing material and then subjecting the assembled structure to a baking temperature.

3. In the art of forming electrical heater elements, successively superimposing on a foundation asbestos sheeting, impregnating composition, insulating composition, thermal element, insulating composition, and impregnating composition, and baking each layer of composition as applied and prior to the application of the next at a temperature of substantially 500° F.

4. In the art of forming electrical heater elements, applying an asbestos sheet upon a metal foundation, impregnating the sheet with binding material, applying thereon an insulating compound free from action upon resistance wire, mounting resistance wire on said compound, coating the resistance wire with inert insulating material, and applying to the last-named material a layer of impregnated sheet asbestos.

5. An electrical heater element comprising a metal foundation, an asbestos sheeting thereon, binding material impregnating said sheeting, an insulating compound on said binding material free from action upon resistance wire, resistance wire mounted on the insulating compound, a coating of inert insulating material on said resistance wire, and a second layer of impregnated sheet asbestos on said inert insulating material.

6. In an electrical heater element, an asbestos sheet, an impregnating layer baked upon said sheet, a thermal element, an insulating body formed upon said element, a second impregnating layer and a second sheet of asbestos, said sheets, layers, and body being coalesced by heating.

7. As a new article of manufacture a heating unit for electrical appliances comprising a foundation, having successively placed thereover asbestos sheeting, impregnating composition, insulating composition, thermal elements, insulating composition and impregnating composition, another layer of asbestos sheeting, and a surrounding jacket, the elements between the foundation and sheeting being fused into a body of insulation.

8. The method of preparing an electrical heater element having a ceramic insulation to withstand a normal voltage continuously, which consists in preparing a resistance adapted to carry safely a supernormal amperage, embedding said resistance in a ceramic material, and applying a supernormal voltage to said resistance to fuse said material about said resistance, and to reduce the carrying capacity of said resistance to a predetermined wattage at said supernormal voltage.

In testimony whereof I affix my signature.

HENRY A. ZIOLA.